June 22, 1965     F. J. LUKETA     3,190,024
LOWER BOSOM SUSPENSION FOR TRAWL NETS
Filed Jan. 3, 1963     5 Sheets-Sheet 1
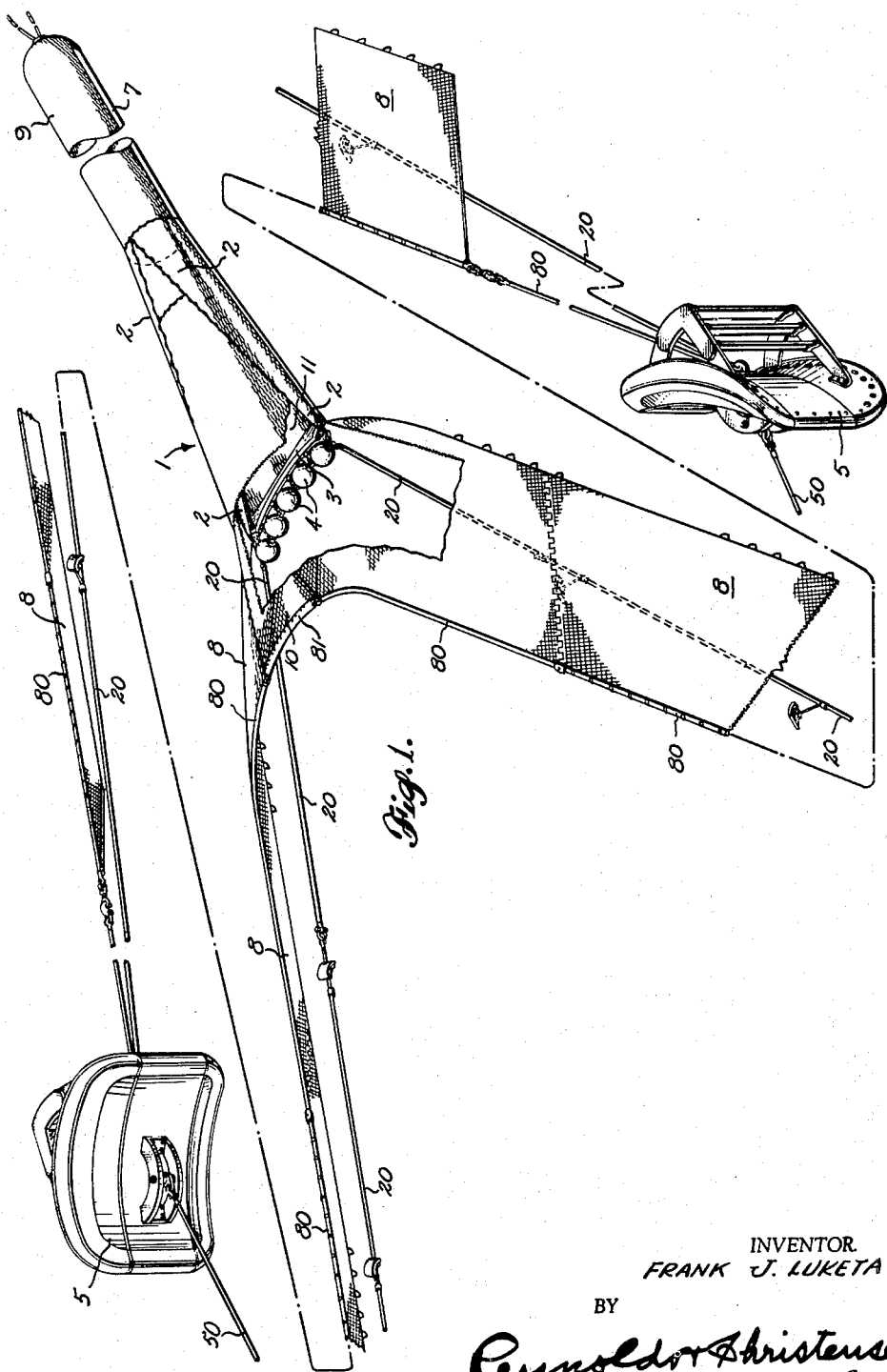
INVENTOR.
FRANK J. LUKETA
BY
*Reynolds Christensen*
ATTORNEYS

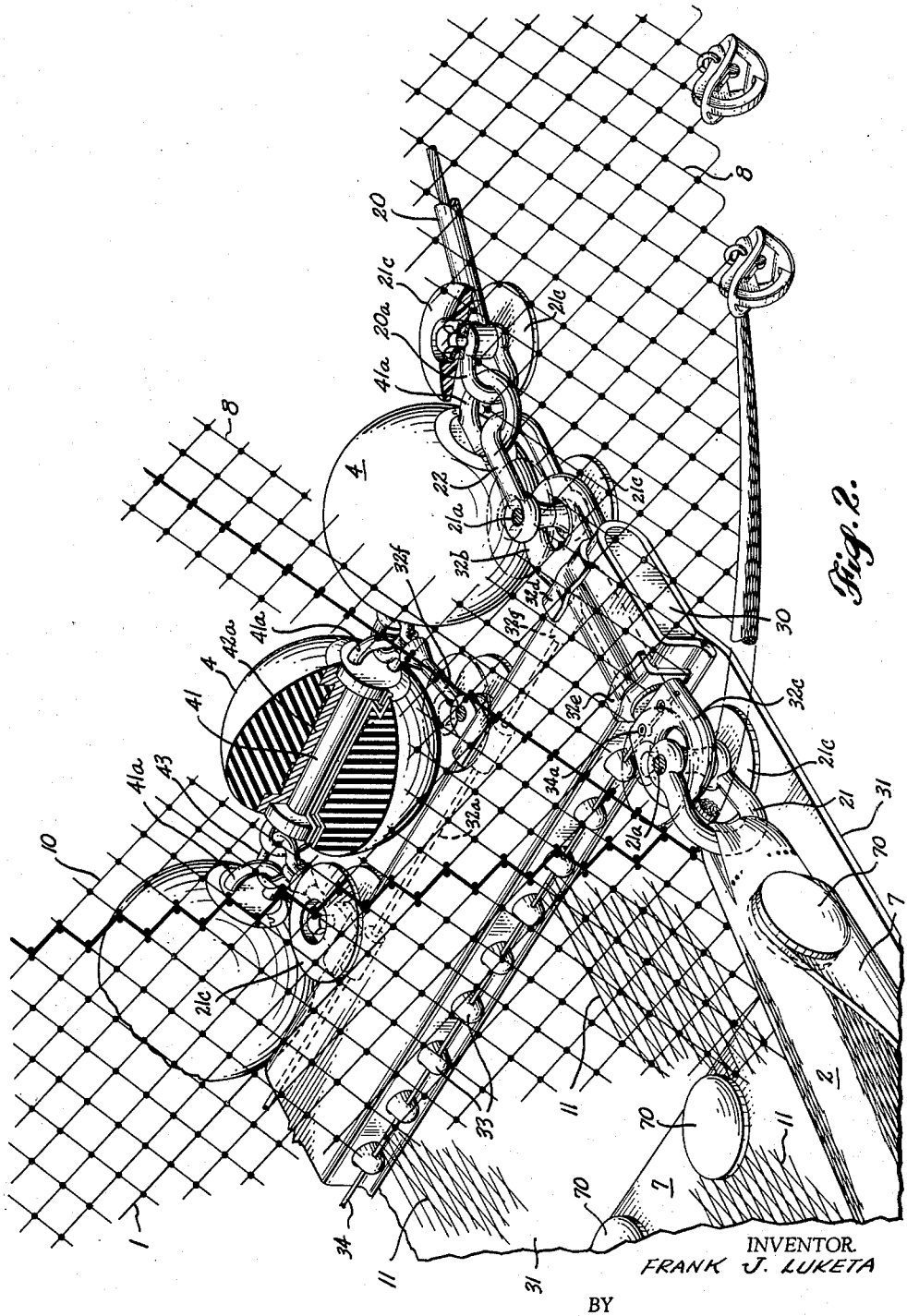

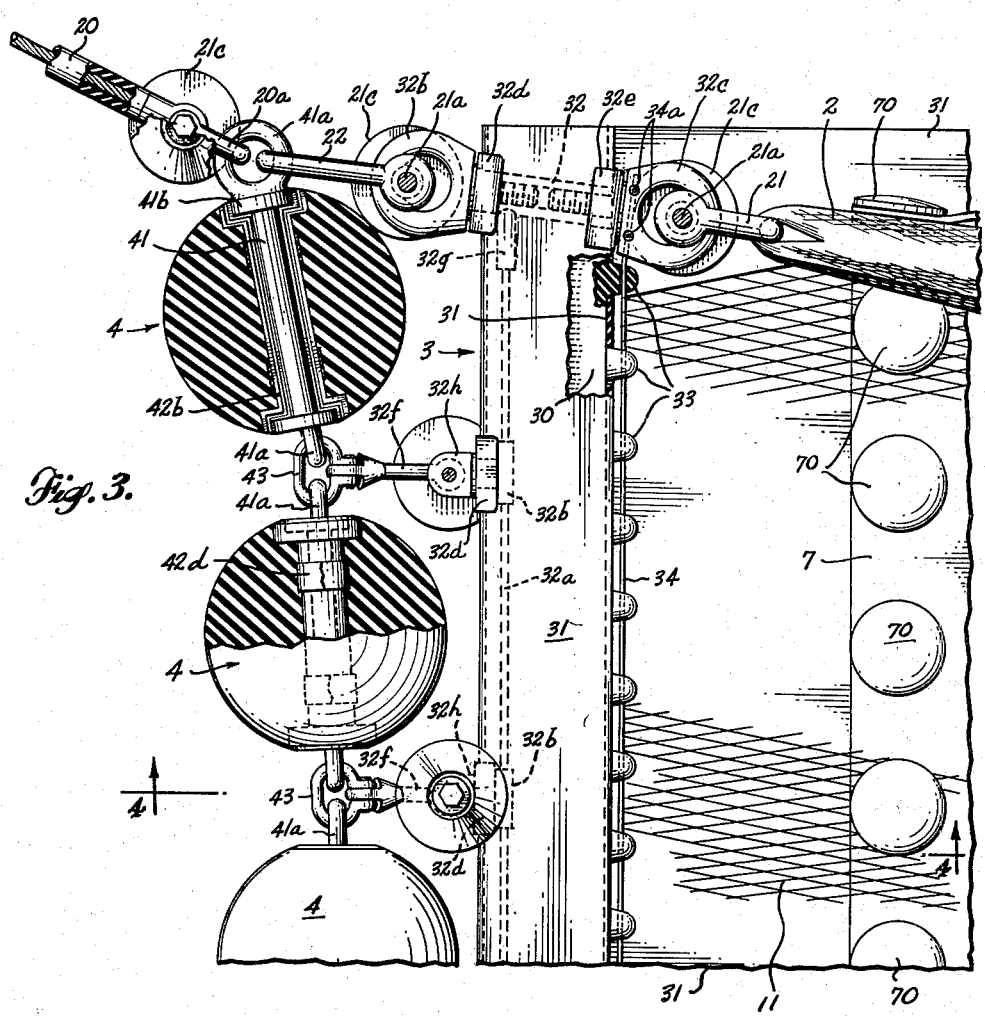
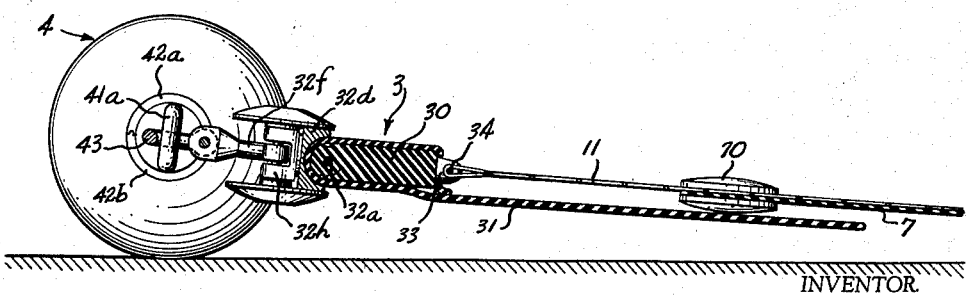

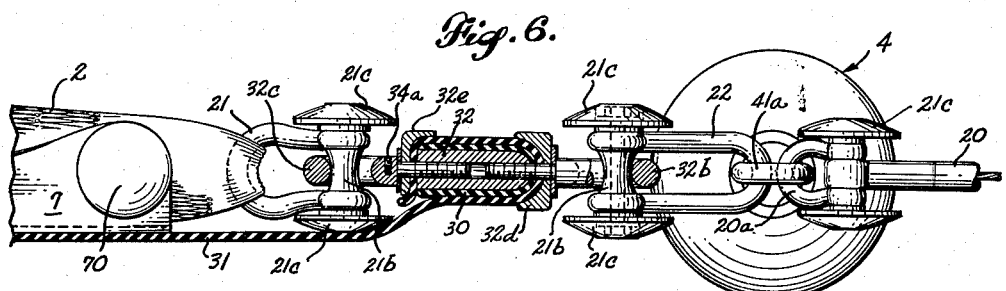
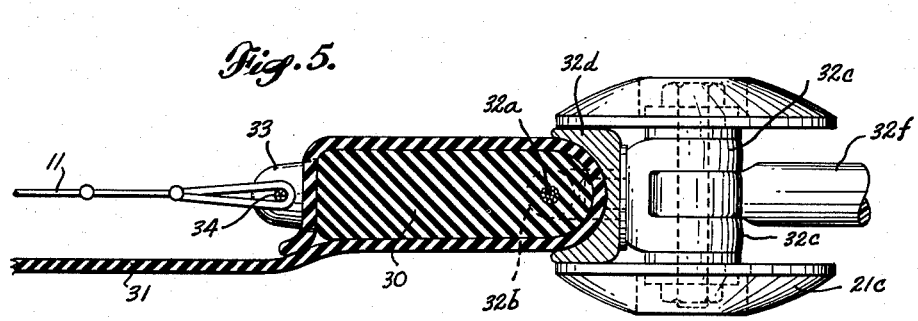
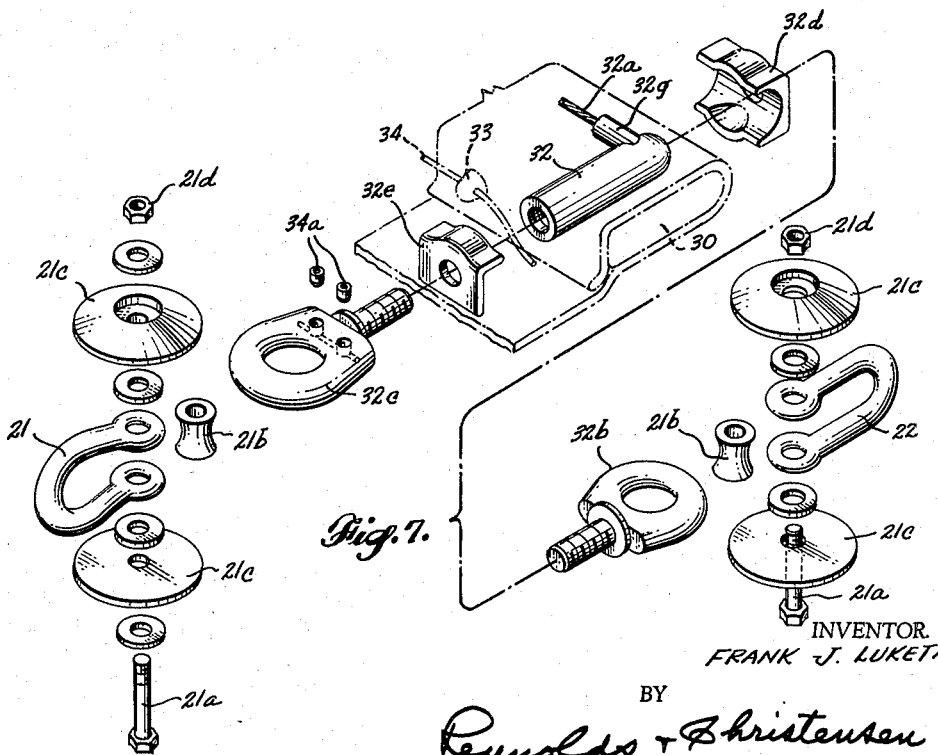

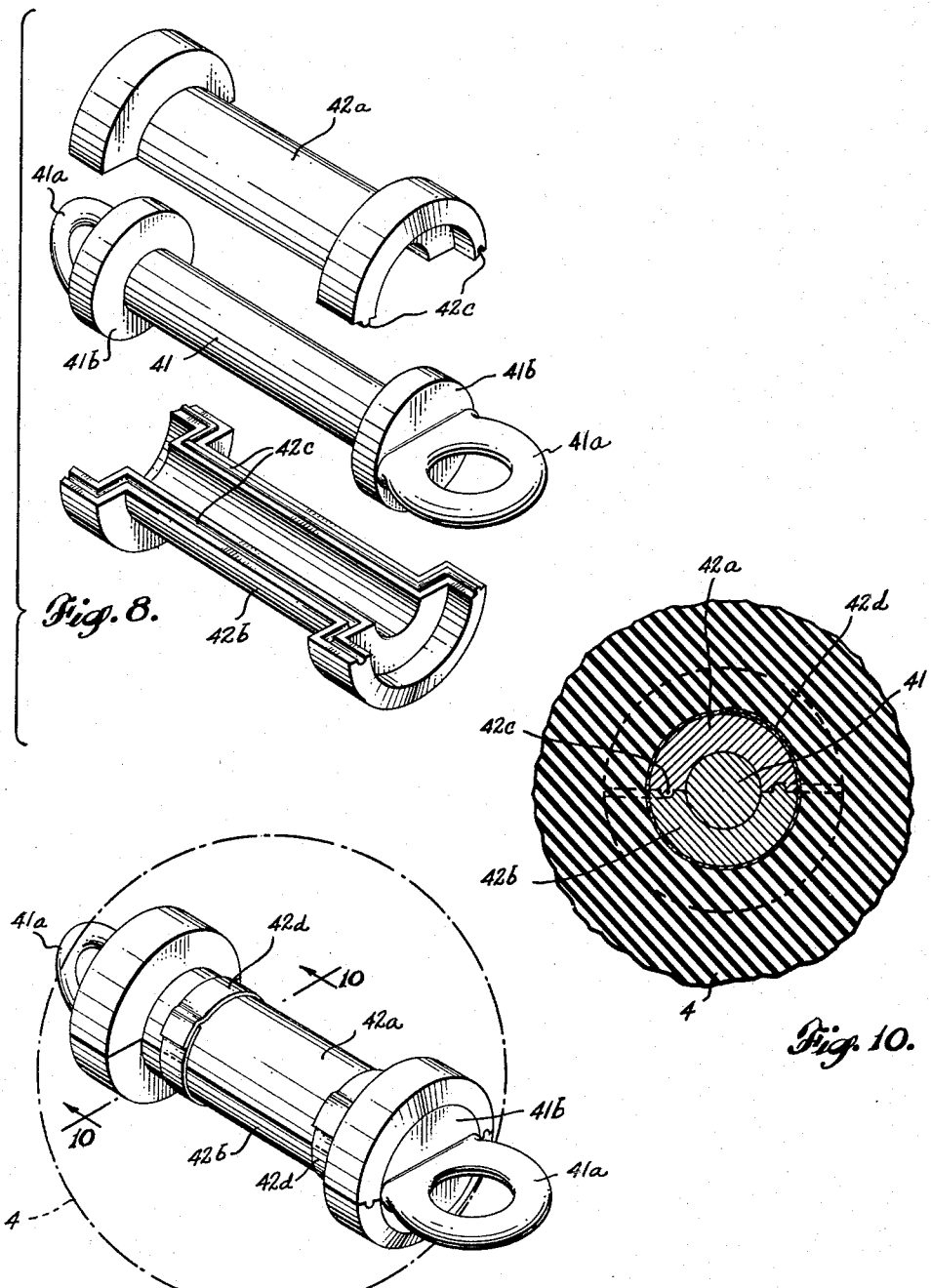

United States Patent Office 3,190,024
Patented June 22, 1965

3,190,024
LOWER BOSOM SUSPENSION FOR TRAWL NETS
Frank J. Luketa, 5567 Greenwood Ave.,
Seattle 3, Wash.
Filed Jan. 3, 1963, Ser. No. 249,265
12 Claims. (Cl. 43—9)

In my copending application Serial No. 178,902, filed March 12, 1962, and entitled Suspension for Trawl Net Panels and Chafing Gear, I have disclosed a suspension whereby a trawl net bottom panel, point-cut transversely across its forward edge, is secured to the rear edge of a sheet of tough, wear-resistant material that has a curved forward edge defining the lower bosom of the net, and transmitting the pull of sweep lines secured to the termini of the bosom, to the net. This suspension sheet underlaps and protects the forward edge of chafing gear sheets which are suspended from the netting, beneath the funnel and codend of the net. The net therein disclosed is intended to be of large capacity, and the lower bosom is supported well above the ocean bottom by rolling bobbins of large diameter.

The present invention relates to a similar suspension, but is of somewhat simpler construction, and is intended for use with a net of somewhat less capacity. Certain principles herein disclosed can also be used in midwater trawl nets.

In particular it is an object of this invention to form the suspension as a simple suspension bar to which the mesh points of the net are secured in a simple manner and to secure the suspension bar to the sweep lines by which it is dragged, and to a bobbin line just ahead of it, also in a simple manner, thereby interconnecting the sweep lines and the lower bosom of the mesh. The apron which in the former arrangement was more or less integral with the suspension sheet is, in this arrangement, secured in a simple manner to the same suspension bar. The entire assembly is secure against accidental disassembly, yet easily disassembled when that is desired.

It is a further object to combine with such a construction a secure and direct connection between each sweep line and the mesh suspender by which the codend is dragged forwardly, while at the same time joining the sweep lines to the termini of the lower bosom, defined by the forward edge of the bar.

Another object is to provide connections at intervals between the suspension bar and the bobbin line that precedes it and to provide a simple construction for the bobbin and the bobbin line about which it rolls.

Other objects, and particularly such as concern details of construction, will appear hereinafter.

The accompanying drawings illustrate the invention in a presently preferred form.

FIGURE 1 is a general isometric view of a bottom trawl net incorporating this invention, parts being broken away.

FIGURE 2 is an enlarged isometric view of a portion of the net in the vicinity of the starboard end of the suspension bar, and FIGURES 3 and 4 are respectively a plan view, partly broken away, and a section view at the line 4—4 of FIGURE 3, of the same end of the suspension bar.

FIGURE 5 is an enlarged view, similar to FIGURE 4, showing the manner of joining the suspension bar and the mesh at the net panel's forward edge, in greater detail.

FIGURE 6 is an elevational view of the interconnection between the sweep line, the suspender, and the suspension bar at one side, the suspension bar being shown in section, and FIGURE 7 is an exploded isometric view of the metal parts and their relation to the suspension bar at the same location.

FIGURE 8 is an exploded isometric view of the rolling bearing for a bobbin, FIGURE 9 is an assembled isometric view of the same, and FIGURE 10 is a section transversely of the axis thereof, at the line 10—10 of FIGURE 9, with the bobbin molded in place.

Referring to FIGURE 1, the net includes a funnel 1, flaring forwardly from the codend 9 into which it leads fish. The codend is dragged forwardly by a pair of mesh suspenders 2, of heavy twine size, to the concentrated forward ends whereof the respective sweep lines 20 are secured. The forward edge of the mesh top 10 of the funnel top 10 of the funnel defines the upper bosom 81, to the termini of which curtain lines 80 are secured, for the support of mesh curtains 8 which, at their lower edge sweep the ocean bottom. The curtain line 80 and the sweep line 20 at each side diverge forwardly to connect with the respective doors 5, which are dragged forwardly by towing warps 50 extending to the trawler. The lower bosom of the funnel is defined by a suspension element designated generally by the numeral 3, with which this invention is particularly concerned, and which will be described more fully hereinafter. The lower bosom is supported somewhat above the bottom, to avoid snagging, by rolling bobbins 4.

The sweep lines 20 assume a greater load than the curtain lines 80. In addition to their being joined to the suspenders 2 they should also be connected to the ends of the suspension 3, in order to hold the latter stretched laterally. The suspension must be joined to the transverse forward edge of the mesh bottom 11, which usually is point-cut. A chafing gear 7 of wear-resistant sheet material underlies the funnel and codend, to protect their mesh from chafing on the bottom, and is secured to the mesh 11 by studs 70 located aft of the forward edge of mesh 11. The exposed forward edge of the chafing gear sheet 7 must be protected against snagging, to which end an apron of like material represented at 31 and supported at the lower bosom, trails aft beneath the forward edge of the chafing gear; see FIGURE 4.

The suspension bar 30, although it might be rigid, is conveniently formed as a molded bar of rubber or like material, tough and resistant to deformation and wear, but not particularly elastic, although flexible. By so molding it it is possible to incorporate in its ends anchor elements 32, in the nature of internally threaded sleeves. A bosom-reinforcing cable 32a joining sleeves 32g which project laterally from the anchor elements 32 at opposite ends of the suspension bar 30 is also incorporated within the molded bar 30. The bar 30 is of the length desired for the lower bosom, which would normally be considerably less than the width of the point-cut forward edge of mesh panel 11 when the latter is relaxed or with meshes fully open.

The sweep line 20 at each side is connected or anchored to its suspender 2 through the intermediatry of the anchor element 32. Eyebolts 32b and 32c pass through the saddles or clamping elements 32d and 32e (the latter a half-saddle) applied externally to the forward and rear edges, respectively, of the bar 30, and screw into the sleeve 32. The gathered forward end of the suspender 2 is received within a clevis 21, and the latter is engaged with the eye of eyebolt 32c through a bolt 21a, wear sleeve 21b, and suitable washers and nuts (see FIGURE 7), including large diameter washers of rubber or nylon 21c recessed to receive the head of bolt 21a and its nut 21d to the end that netting of the trawl will not snag on them and the large diameter prevents the washers themselves or the clevis ends from becoming snagged in the netting and causing damage or tearing. The sweep line 20 is anchored to the eyebolt 32b in substantially the same manner, except that the clevis 22 which engages the eyebolt 32b connects to an eye 41a at the end of a bobbin line, to be described later, and a clevis 20a at the end of the sweep line 20 connects to the same eye 41a.

By the arrangement just described the sweep lines 20 are anchored to the respective ends of the suspension bar 30, and each is anchored to its suspender 2. Nevertheless the connections are readily separable, in the event it becomes necessary to replace some element of the assembly.

By molding the bar 3 it is feasible to mold outstanding studs 33 along its after edge. These have a dual function, to support the forward edge of the mesh panel 11 through the intermediary of a hanging line 34 passed through forward points of the mesh and threaded through holes in the studs 33, and to support the protective apron 31 which has holes along its edge of a size to snugly receive the studs. The apron extends upwardly and over the suspension bar 30 from the studs 33, then wraps about the bar's forward edge and trails aft beneath the bar, until it underlaps the forward edge of the chafing gear 7 and its studs 70. The apron 31 can not be removed so long as the hanging line 34 remains in place, and is held wrapped about the bar 30 by the saddles or clamping elements 32d, 32e. The ends of the hanging line are threaded through holes in the eyebolt 32c, and are held therein by set screws 34a.

The bar 30 could be curved across its forward edge, to simulate the catenary curve of a free net bosom and to relieve stresses but is instead straight and is suspended from the curved bobbin line by links of various and appropriate lengths.

The lower bosom, defined by the bar 30, is held above the bottom during trawling by rolling bobbins 4. Preferably these are molded of tough rubber about a rotative bearing which is incorporated in the bosom line referred to above. Details of the construction of the bearing appear in FIGURES 8, 9 and 10. A spindle 41 is flanged at 41b at its opposite ends, the eyes 41a standing out from these flanges. The spindle and its flanges are encircled by a split sleeve 42a, 42b which halves are identically rabbeted and grooved along the matching edges, at 42c, FIGURE 8. The split halves 42a, 42b are secured about the spindle 41, with sufficient clearance for bearing, by means such as the tape strips 42d; see FIGURE 9. The mass of the bobbin 4 is molded about the sleeve 42a, 42b in any suitable shape, globular as shown.

Several such bobbins are connected by clevises 43 joining their eyes 41a, directly or indirectly, to constitute the bobbin line. The eye 41a at each end of the bobbin line connects clevis 22 leading to the suspender 2, and clevis 20a at the end of sweep line 20. At intervals in its length the bobbin line is joined to the suspension bar 30 immediately to its rear. This can be done by means of clevises 32h each secured to a sleeve 32b. The sleeves 32b surround and are spaced at suitable intervals along the bosom reinforcing line 32a. The clevises 32h project forwardly from the suspension bar 30; links 32f project forwardly from and are pivoted to the clevis 32c, and clevises 43 join two eyes 41a of adjoining bobbins, and are pivoted to the forward end of their respective links 32f. These connections are spaced intermediate successive bobbins 4. The bobbin line, in effect, comprises the terminal eye 41a, spindle 41 of the first bobbin, its opposite eye 41a, clevis 43, the next bobbin's eye 41a, its spindle, and so on to the opposite terminal eye 41a.

From the foregoing, further variations, adaptations, modifications and characteristic features of lower bosom suspension elements and assemblies for trawl nets can be evolved by those skilled in the art to which the invention is addressed, within the scope of the following claims.

I claim as my invention:

1. In a trawl net, in combination with a mesh panel constituting a part of the net's funnel, and having a transverse forward edge, a suspender of mesh at each side extending aft from the vicinity of such forward edge for connection to the net's codend, and a sweep line extending forwardly in general alignment with each suspender, means for interconnecting the mesh panel, the suspenders, and the sweep lines, said means comprising a suspension bar extending across and ahead of the forward edge of the bottom portion of said mesh panel, means for securing the mesh of said bottom portion of said mesh panel at intervals to said bar, tension means carried by each end of said bar, and attaching means engaged with and attached to the forward end of each suspender and with the after end of each sweep line, and engageable with the rear and the forward ends, respectively, of the tension means at the corresponding end of the suspension bar.

2. A trawl net combination as in claim 1, wherein the suspension bar is formed with a plurality of studs outstanding from and spaced along its rear edge, and a hanging line secured successively to each of said studs, and passing through meshes at the forward edge of the bottom panel, intermediate successive studs, constituting the means for securing the panel to the bar.

3. A trawl net combination as in claim 2, for use at the bottom of a bottom trawl net, including an apron of flexible, wear-resistant material having apertures along one edge through which the studs are passed, said apron extending upwardly over the bar, about its forward edge, and trailing thence aft beneath the bar and the bottom panel, the hanging line being secured to the studs outwardly of the apertured portion of the apron that engages the studs, to retain said apron so long as the hanging line remains in place.

4. A trawl net combination as in claim 2, wherein the studs are formed with holes through which the hanging line is threaded to secure it in place.

5. A trawl net combination as in claim 4, including means to secure the ends of the hanging line to the tension means at the respective ends of the suspension bar.

6. A trawl net combination as in claim 1, wherein the tension means at each end of the bar includes an internally threaded sleeve incorporated within the bar and extending generally fore-and-aft, an eye bolt threaded therein at each end and having its eye located externally thereof, a clevis secured to the forward end of the suspender and engaged with one such eye, and a clevis connected to the after end of the sweep line and engaged with the other such eye.

7. In a trawl net having fore and aft extending net suspenders and sweep line means, a mesh panel constituting a part of the net's funnel, and having a transverse forward edge, a suspension bar extending across and ahead of such forward edge, means to secure the forward edge of the mesh panel to said bar, an internally threaded sleeve incorporated within each end of the bar, and directed fore-and-aft, an eye bolt threaded into each end of the sleeve, a clevis secured to each eye bolt by a headed clevis bolt through the eye bolt and a nut on the clevis bolt, and washers on the clevis bolt externally of the clevis, recessed to receive and protect said nut and the head of the clevis bolt, said clevises at the respective ends of each sleeve being arranged for securement to a net suspender and to a sweep line means, respectively.

8. The combination of claim 7, including a flexible apron of tough material enwrapping the suspension bar and trailing aft beneath the mesh panel, and clamping elements embracing said apron where it passes about edges of the bar, the eye bolts passing through and securing said clamping elements in place.

9. The combination of claim 8, wherein the means to secure the edge of the mesh panel to the bar includes apertured studs projectting aft at intervals along the bar and a hanging line threaded through the apertures in the studs and through meshes intermediate the studs, an eye bolt at each end of the bar being similarly apertured to receive and anchor the ends of the hanging line.

10. In a trawl net, a funnel including a bottom panel of mesh having a transverse forward edge, a suspension bar of a flexible, tough, wear-resistant material, a fore and aft extending interiorly threaded sleeve incorporated in each end of said suspension bar, sweep line means extending forwardly from each end of said suspension bar, a net suspender extending rearwardly from each end of said suspension bar, and means, threadable into each said sleeve, for connecting each sweep line means to the net suspender at its end of the suspension bar, bosom reinforcing line means extending through the suspension bar and interconnecting said sleeves, a bobbin line and bobins thereon, extending transversely ahead of said suspension bar, means for securing the respective ends of said bobbin line means to the net suspensers, and means interconnecting the bobbin line at intervals to said bosom reinforcing line.

11. A combination of claim 10, wherein the means interconnecting the bobbin line and the bosom reinforcing line include link elements anchored at their after ends to the bosom reinforcing line and extending forwardly of the suspension bar, and means for connecting the forward ends of said link elements to the bobbin line.

12. In a trawl net, in combination with a mesh panel constituting a part of the net's funnel, and having a forward portion including a transverse forward edge, a relatively rigid, transversely extending, suspension bar extending along and ahead of said forward edge, said bar including a plurality of apertured studs spaced at intervals along its rear edge, a transverse hanging line extending adjacent the rear edge of said suspension bar, and alternately through the apertures of said studs and the meshes of the forward portion of the mesh panel, lines for towing the net forwardly, and means securing the ends of the suspension bar to the towing lines and securing the ends of said hanging line adjacent the ends of the suspension bar.

References Cited by the Examiner
UNITED STATES PATENTS 2,560,622  7/51  Abramowski _____ 43—9
2,894,366  7/59  Leckie _____ 43—7 X

FOREIGN PATENTS 816,325  10/51  Germany.

ABRAHAM G. STONE, *Primary Examiner.*
F. RAY CHAPPELL, *Examiner.*